US012128900B2

(12) United States Patent
Kikuchi

(10) Patent No.: US 12,128,900 B2
(45) Date of Patent: Oct. 29, 2024

(54) VEHICLE CONTROLLER, AND METHOD AND COMPUTER PROGRAM FOR CONTROLLING VEHICLE

(71) Applicant: TOYOTA JIDOSHA KABUSHIKI KAISHA, Toyota (JP)

(72) Inventor: Takuro Kikuchi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 17/655,759

(22) Filed: Mar. 21, 2022

(65) Prior Publication Data
US 2022/0297694 A1    Sep. 22, 2022

(30) Foreign Application Priority Data
Mar. 22, 2021   (JP) .................................. 2021-047731

(51) Int. Cl.
*B60W 30/18*        (2012.01)
*G06V 10/764*       (2022.01)
*G06V 20/56*        (2022.01)

(52) U.S. Cl.
CPC ..... *B60W 30/18163* (2013.01); *G06V 10/764* (2022.01); *G06V 20/588* (2022.01); *B60W 2552/53* (2020.02)

(58) Field of Classification Search
CPC ........................ B60W 30/18163; G06V 10/764
See application file for complete search history.

(56) References Cited

U.S. PATENT DOCUMENTS

| 11,193,782 | B2 * | 12/2021 | Daikoku | .............. G06V 20/588 |
| 2017/0166127 | A1 * | 6/2017 | Han | ...................... B60W 40/06 |
| 2018/0165525 | A1 * | 6/2018 | Hamada | ................. G01C 21/30 |
| 2018/0204073 | A1 * | 7/2018 | Kawano | ................ B60W 30/12 |
| 2018/0229733 | A1 * | 8/2018 | Upmanue | ........ B60W 30/18163 |
| 2018/0354519 | A1 * | 12/2018 | Miyata | ............ B60W 30/18163 |
| 2019/0018410 | A1 | 1/2019 | Ando | |
| 2019/0095722 | A1 * | 3/2019 | Kang | ................... G06V 20/588 |
| 2019/0263411 | A1 * | 8/2019 | Saikyo | ................. G05D 1/0214 |
| 2019/0286149 | A1 | 9/2019 | Miura et al. | |
| 2020/0189587 | A1 * | 6/2020 | Imai | ..................... B60W 30/162 |
| 2020/0240806 | A1 * | 7/2020 | Daikoku | ................ G01C 21/38 |

(Continued)

FOREIGN PATENT DOCUMENTS

JP    2015223933 A    12/2015
JP    2016177622 A    10/2016

(Continued)

*Primary Examiner* — Long T Tran
(74) *Attorney, Agent, or Firm* — Dickinson Wright, PLLC

(57) ABSTRACT

A vehicle controller includes a processor configured to detect the type of lane line demarcating a travel lane being traveled by a vehicle from a sensor signal generated by a sensor mounted on the vehicle, the sensor signal representing surroundings of the vehicle, and determine whether the detected type of lane line matches the type of lane line represented in map information between the travel lane and an adjacent lane adjacent thereto at the current position of the vehicle when a lane change to the adjacent lane is required. The processor is further configured to control the vehicle to start a lane change to the adjacent lane in the case that the detected type of lane line matches the type of lane line represented in the map information.

3 Claims, 5 Drawing Sheets

(56) References Cited

U.S. PATENT DOCUMENTS

| | | | |
|---|---|---|---|
| 2020/0312151 A1* | 10/2020 | Ikeda | G08G 1/167 |
| 2021/0088352 A1* | 3/2021 | Nishida | G01C 21/3658 |
| 2021/0107510 A1* | 4/2021 | Kato | B60W 30/18163 |
| 2021/0248391 A1* | 8/2021 | Kizumi | G01C 21/3863 |
| 2022/0205810 A1* | 6/2022 | Wada | G01C 21/3815 |

FOREIGN PATENT DOCUMENTS

| | | |
|---|---|---|
| JP | 2017084137 A | 5/2017 |
| JP | 2019132762 A | 8/2019 |
| WO | 2016110732 A1 | 7/2016 |

\* cited by examiner

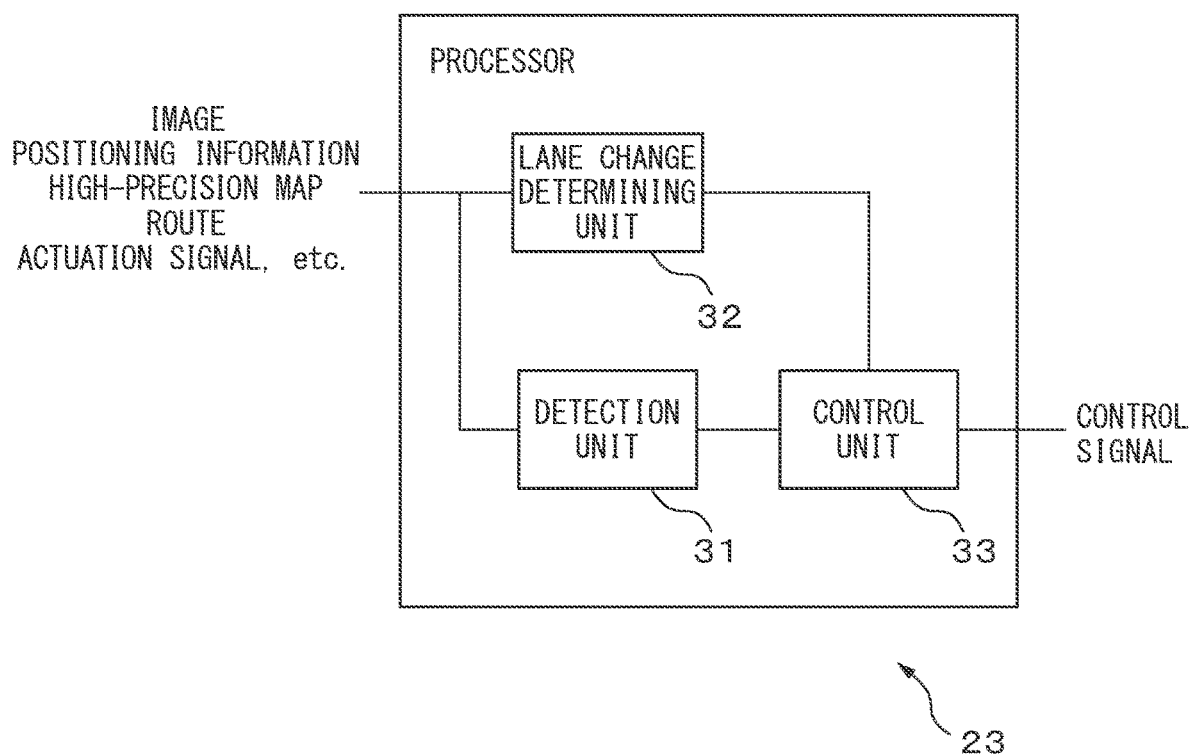

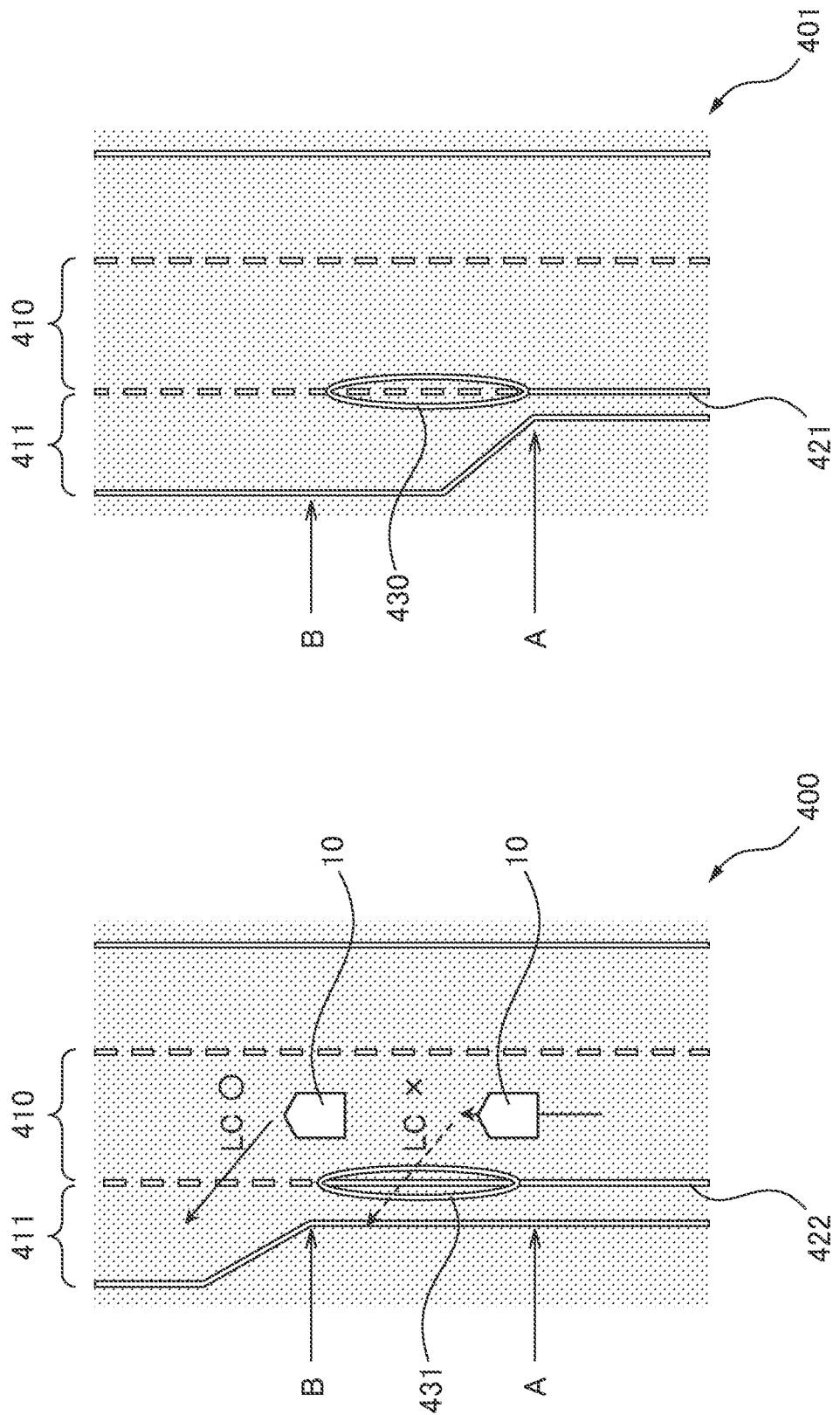

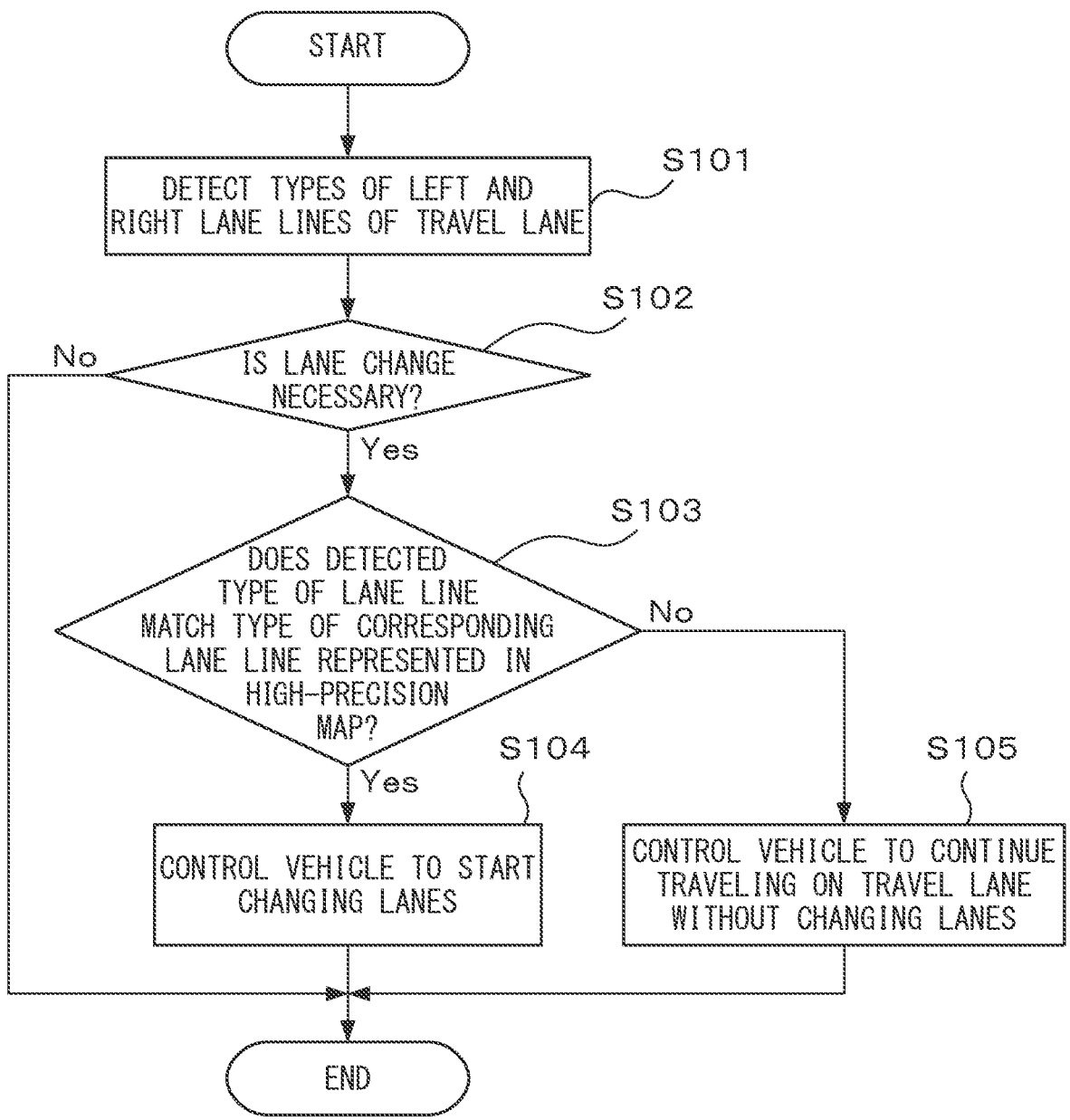

VEHICLE CONTROLLER, AND METHOD AND COMPUTER PROGRAM FOR CONTROLLING VEHICLE

FIELD

The present invention relates to a vehicle controller, and a method and a computer program for controlling a vehicle.

BACKGROUND

Techniques for automatically driving a vehicle or assisting a vehicle driver in driving have been researched. In particular, techniques for making a vehicle automatically change lanes from a lane being traveled by the vehicle to a lane adjacent thereto or assisting in such a lane change have been proposed (see Japanese Unexamined Patent Publication No. 2016-177622 and International Publication No. 2016/110732).

An information processor described in Japanese Unexamined Patent Publication No. 2016-177622 detects multiple lanes including at least a travel lane being traveled by a vehicle and an adjacent lane adjacent thereto, and causes a means capable of presenting information to an occupant of the vehicle to present information indicating the positional relationship between the travel lane and the adjacent lane based on the result of detection.

A target route generation device disclosed in International Publication No. 2016/110732 determines whether a lane change point exists, based on obtained map information, and, if any, determines whether an obstacle exists near the lane change point. The device generates a target route of a vehicle so that the vehicle will pass the lane change point differently depending on whether it is determined that an obstacle exists.

SUMMARY

To determine where to change lanes, a vehicle refers to images representing surroundings of the vehicle or map information representing the road structure around the vehicle. However, the map information does not always represent the latest road structure around the vehicle. The road structure represented in map information used by a vehicle for changing lanes may differ from the actual road structure, for example, in the case that construction was carried out after the generation of the map information near the location where the lane change will be made.

It is an object of the present invention to provide a vehicle controller that can make a vehicle change lanes at an appropriate position.

According to an embodiment, a vehicle controller is provided. The vehicle controller includes a memory configured to store map information representing individual lanes on a road and the types of lane lines between lanes; and a processor configured to detect the type of lane line demarcating a travel lane being traveled by a vehicle from a sensor signal generated by a sensor mounted on the vehicle, the sensor signal representing surroundings of the vehicle, determine whether the detected type of lane line matches the type of lane line represented in the map information between the travel lane and an adjacent lane adjacent thereto at the current position of the vehicle when a lane change to the adjacent lane is required, and control the vehicle to start a lane change to the adjacent lane in the case that the detected type of lane line matches the type of lane line represented in the map information.

It is preferable that the processor of the vehicle controller is further configured to control the vehicle so that the vehicle continues traveling on the travel lane, in the case that the detected type of lane line differs from the type of lane line represented in the map information.

According to another embodiment, a method for controlling a vehicle is provided. The method includes detecting the type of lane line demarcating a travel lane being traveled by a vehicle from a sensor signal generated by a sensor mounted on the vehicle, the sensor signal representing surroundings of the vehicle; and determining whether the detected type of lane line matches the type of lane line represented in map information between the travel lane and an adjacent lane adjacent thereto at the current position of the vehicle when a lane change to the adjacent lane is required. The map information represents individual lanes on a road and the types of lane lines between lanes. The method further includes controlling the vehicle to start a lane change to the adjacent lane in the case that the detected type of lane line matches the type of lane line represented in the map information.

According to still another embodiment, a non-transitory recording medium that stores a computer program for controlling a vehicle is provided. The computer program includes instructions causing a processor to execute a process including detecting the type of lane line demarcating a travel lane being traveled by a vehicle from a sensor signal generated by a sensor mounted on the vehicle, the sensor signal representing surroundings of the vehicle; and determining whether the detected type of lane line matches the type of lane line represented in map information between the travel lane and an adjacent lane adjacent thereto at the current position of the vehicle when a lane change to the adjacent lane is required. The map information represents individual lanes on a road and the types of lane lines between lanes. The process further includes controlling the vehicle to start a lane change to the adjacent lane in the case that the detected type of lane line matches the type of lane line represented in the map information.

The travel vehicle controller according to the present invention has an advantageous effect of being able to make a vehicle change lanes at an appropriate position.

BRIEF DESCRIPTION OF DRAWINGS

FIG. 3 is a functional block diagram of a processor of the electronic control unit, related to a vehicle control process.

FIG. 4 is a schematic diagram for explaining vehicle control according to the embodiment.

FIG. 5 is an operation flowchart of a vehicle control process.

DESCRIPTION OF EMBODIMENTS

A vehicle controller as well as a method and a computer program for controlling a vehicle executed by the vehicle controller will now be described with reference to the attached drawings. The vehicle controller detects the type of lane line demarcating a lane being traveled by a vehicle (hereafter, a "travel lane") from a sensor signal that is generated by a sensor mounted on the vehicle and that represents surroundings of the vehicle. More specifically, the vehicle controller detects the type of lane line between the travel lane and an area on the road adjacent to the travel lane (hereafter, an "adjacent area"). The adjacent area is, for example, a lane adjacent to the travel lane (hereafter, an "adjacent lane") or the shoulder or margin of the road. Examples of the lane line demarcating the travel lane include not only one between the travel lane and an adjacent lane but also one between the travel lane and an adjacent area other than an adjacent lane (e.g., the shoulder or margin of the road). When a lane change to the left or right adjacent lane is required, the vehicle controller further identifies the type of lane line represented in map information between the travel lane and the adjacent lane at the current position of the vehicle. The vehicle controller then determines whether the type of lane line actually detected on the destination side of the travel lane matches that represented in the map information. In the case that the detected type of lane line matches the type of lane line represented in the map information, the vehicle controller determines that an accessible adjacent lane actually exists on the destination side of the travel lane, and controls the vehicle to start a lane change to the adjacent lane. In the case that the detected type of lane line differs from the type of lane line represented in the map information, the adjacent area on the destination side may be an area other than a lane, such as the shoulder or margin of the road, or a lane change to the adjacent lane on the destination side may be prohibited. In this case, the vehicle controller does not start changing lanes. In this way, the vehicle controller determines whether to start changing lanes by referring to not only map information but also the actual road structure around the vehicle represented by a sensor signal, which enables changing lanes at an appropriate position. As a result, the vehicle controller can prevent a lane change to an adjacent lane at a position where such a lane change cannot be actually made because the map information is not updated with the latest road structure around the current position of the vehicle.

Figure 1:
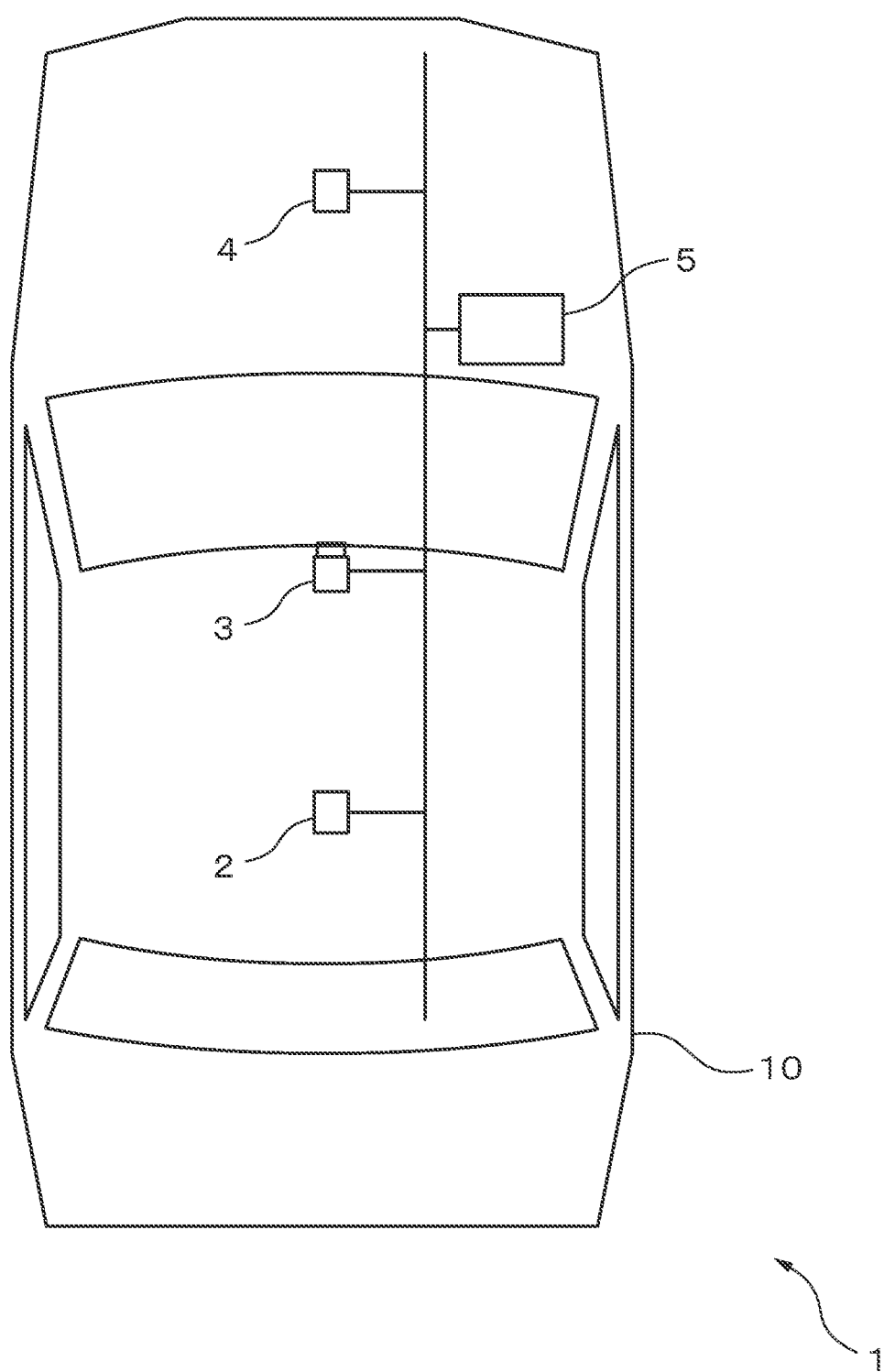
FIG. 1 schematically illustrates the configuration of a vehicle control system equipped with a vehicle controller.
Figure 2:
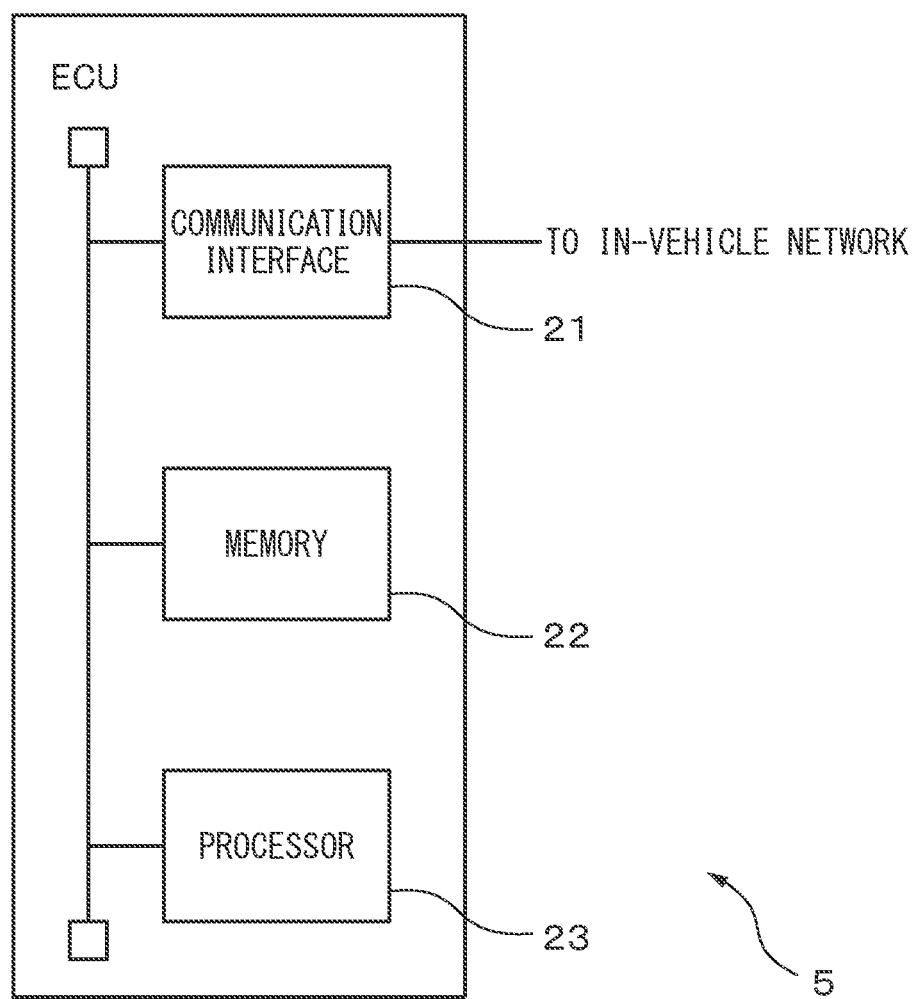
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In this embodiment, the vehicle control system 1, which is mounted on a vehicle 10 and controls the vehicle 10, includes a GPS receiver 2, a camera 3, a storage device 4, and an electronic control unit (ECU) 5, which is an example of the vehicle controller. The GPS receiver 2, the camera 3, and the storage device 4 are connected to the ECU 5 via an in-vehicle network conforming to a standard, such as a controller area network, so that they can communicate with each other. The vehicle control system 1 may further include a distance sensor (not illustrated), such as LiDAR or radar, which measures the distances from the vehicle 10 to objects around the vehicle 10; a navigation device (not illustrated) for searching for a planned travel route to a destination; and a wireless communication device (not illustrated) for wireless communication with another device.

The GPS receiver 2, which is an example of a position measuring unit, receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 5 via the in-vehicle network at predetermined intervals. The vehicle 10 may include a receiver conforming to a satellite positioning system other than the GPS receiver 2. In this case, this receiver determines the position of the vehicle 10.

The camera 3, which is an example of a sensor for generating a sensor signal representing surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 3 is mounted, for example, in the interior of the vehicle 10 so as to be oriented, for example, to the front of the vehicle 10. The camera 3 captures a region in front of the vehicle 10 every predetermined capturing period (e.g., 1/30 to 1/10 seconds), and generates images in which this region is captured. The images obtained by the camera 3, each of which is an example of the sensor signal, may be color or grayscale images. The vehicle 10 may include multiple cameras taking pictures in different orientations or having different focal lengths.

Every time the camera 3 generates an image, the camera 3 outputs the generated image to the ECU 5 via the in-vehicle network.

The storage device 4, which is an example of the storage unit, includes, for example, at least one of a hard disk drive, a nonvolatile semiconductor memory, and an optical recording medium and an access device therefor. The storage device 4 stores a high-precision map, which is an example of the map information. The high-precision map includes, for example, information indicating individual lanes at locations of a road included in a predetermined region represented in this map, the presence or absence of lane lines dividing the individual lanes, and the types of the lane lines.

The storage device 4 may further include a processor for executing, for example, a process to update the high-precision map and a process related to a request from the ECU 5 to read out the high-precision map. In this case, for example, every time the vehicle 10 moves a predetermined distance, the storage device 4 transmits the current position of the vehicle 10 and a request to obtain a high-precision map to a map server via the wireless communication device (not illustrated). The storage device 4 then receives a high-precision map of a predetermined region around the current position of the vehicle 10 from the map server via the wireless communication device. When receiving a request from the ECU 5 to read out the high-precision map, the storage device 4 cuts out that portion of the high-precision map stored therein which includes the current position of the vehicle 10 and which represents a region smaller than the predetermined region, and outputs the cut portion to the ECU 5 via the in-vehicle network.

The ECU 5 controls travel of the vehicle 10 to automatically drive the vehicle 10.

As illustrated in FIG. 2, the ECU 5 includes a communication interface 21, a memory 22, and a processor 23. The communication interface 21, the memory 22, and the processor 23 may be separate circuits or a single integrated circuit.

The communication interface 21 includes an interface circuit for connecting the ECU 5 to the in-vehicle network. Every time the communication interface 21 receives positioning information from the GPS receiver 2, the communication interface 21 passes the positioning information to the processor 23. Every time the communication interface 21 receives an image from the camera 3, the communication interface 21 passes the received image to the processor 23. Additionally, the communication interface 21 passes the high-precision map read from the storage device 4 to the processor 23.

The memory 22, which is another example of the storage unit, includes, for example, volatile and nonvolatile semiconductor memories. The memory 22 stores various types of data used in a vehicle control process executed by the processor 23 of the ECU 5. For example, the memory 22 stores images of surroundings of the vehicle 10; the result of determination of the position of the vehicle; the high-precision map; internal parameters indicating the focal length, angle of view, orientation, and mounted position of the camera 3; and a set of parameters for specifying a classifier used for detecting, for example, lane lines. Additionally, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

FIG. 3 is a functional block diagram of the processor 23, related to the vehicle control process. The processor 23 includes a detection unit 31, a lane change determining unit 32, and a control unit 33. These units included in the processor 23 are, for example, functional modules implemented by a computer program executed on the processor 23, or may be dedicated operating circuits provided in the processor 23.

The detection unit 31 detects the types of lane lines demarcating the travel lane on the left and right thereof, i.e., those of lane lines between the travel lane and the left and right adjacent areas, based on an image obtained by the ECU 5 from the camera 3. For example, the detection unit 31 inputs the latest image into a classifier that has been trained to detect lane lines from an image and to determine the types of the detected lane lines, thereby detecting lane lines represented in the latest image and determining the types of the detected lane lines. As such a classifier, the detection unit 31 may uses, for example, a deep neural network (DNN) for object detection having a convolutional neural network (CNN) architecture, e.g., Single Shot MultiBox Detector (SSD) or Faster R-CNN. Alternatively, as the classifier, the detection unit 31 may use a DNN for semantic segmentation that identifies, for each pixel, the type of object represented in the pixel, e.g., a fully convolutional network (FCN) or U-net. Such a classifier is trained in advance with a large number of training images, including images representing lane lines, in accordance with a predetermined training technique, such as backpropagation.

The detection unit 31 determines that one of the detected lane lines located on the right of and closest to a reference position in the image corresponding to the travel direction of the vehicle 10 (e.g., the horizontal midpoint on the bottom of the image) is the right lane line of the travel lane. The detection unit 31 then determines that the type of the right lane line of the travel lane is that outputted by the classifier for the right lane line. Similarly, the detection unit 31 determines that one of the detected lane lines located on the left of and closest to the reference position is the left lane line of the travel lane. The detection unit 31 then determines that the type of the left lane line of the travel lane is that outputted by the classifier for the left lane line.

The detection unit 31 may detect lane lines from the image and determine the types of the detected lane lines in accordance with another technique. For example, the detection unit 31 may detect lane lines by template matching of the image with templates prepared for the respective types of lane lines. In this case, the detection unit 31 may determine that a type of lane line is represented in a region where the degree of match with the template of this type is not less than a predetermined threshold. In this case, the detection unit 31 may calculate a normalized cross-correlation value between the template and the corresponding region in the image as the degree of match between them.

The detection unit 31 notifies the control unit 33 of the types of the right and left lane lines of the travel lane.

The lane change determining unit 32 determines whether the vehicle 10 needs a lane change from the travel lane to the left or right adjacent lane. For example, the lane change determining unit 32 refers to the high-precision map to determine whether the section from the current position of the vehicle 10 to a predetermined distance away includes a branch point where the road being traveled by the vehicle 10 branches off. In the case that there is a branch point in the section, the lane change determining unit 32 identifies the lane to be traveled at the branch point for the vehicle 10 to go to a destination, by referring to the route to the destination received from the navigation device (not illustrated) mounted on the vehicle 10. In the case that the identified lane differs from the travel lane, the lane change determining unit 32 further determines that the vehicle 10 needs a lane change to the identified lane.

In this case, to identify the travel lane, the lane change determining unit 32 refers to the high-precision map and the current position of the vehicle 10 represented by the latest positioning information obtained from the GPS receiver 2. Of the individual lanes represented in the high-precision map, the lane change determining unit 32 identifies the lane including the current position of the vehicle 10 as the travel lane.

Alternatively, the lane change determining unit 32 may compare the latest image obtained by the camera 3 with the high-precision map to detect the travel lane. In this case, for example, the lane change determining unit 32 inputs the image into a classifier to detect features on or near the road represented in the image. As such a classifier, the lane change determining unit 32 may use, for example, a DNN having a CNN architecture as described in relation to the detection unit 31. Alternatively, the classifier for detecting lane lines used by the detection unit 31 may be trained in advance to detect other features as well as lane lines. With an assumption about the position and orientation of the vehicle 10, the lane change determining unit 32 projects features detected from the image onto the high-precision map or features on or near the road around the vehicle 10 in the high-precision map onto the image by referring to internal parameters of the camera 3. Then, the lane change determining unit 32 estimates the current position and orientation of the vehicle 10 to be the position and orientation of the vehicle 10 for the case that the features detected from the image best match those represented in the high-precision map. Of the individual lanes represented in the high-precision map, the lane change determining unit 32 detects the lane including the estimated current position of the vehicle 10 as the travel lane.

Alternatively, when the driver actuates a turn signal (not illustrated) provided in the interior of the vehicle 10, the lane change determining unit 32 may determine that the vehicle 10 needs a lane change to the adjacent lane on the side designated by an actuation signal from the turn signal depending on this actuation.

Upon determination that a lane change is necessary, the lane change determining unit 32 notifies the control unit 33 of the necessity for a lane change and the direction thereof (the left or right of the travel lane). When a lane change is required for the vehicle 10 to go to a destination, the lane change determining unit 32 further notifies the control unit 33 of a location before which the lane change needs to be finished (e.g., the location where the travel lane and an adjacent lane to go to the destination branch off).

The control unit 33 reads the type of lane line represented in the high-precision map between the travel lane and the left or right adjacent lane at the current position of the vehicle (hereafter, the "type of line in the map") from the memory 22 when a lane change to the adjacent lane is required. Then, the control unit 33 determines whether the type of line in the map matches that of the left or right lane line of the travel lane actually detected on the destination side. In the case that the type of line in the map matches the detected type of lane line, the control unit 33 determines that an accessible adjacent lane actually exists on the destination side. The control unit 33 then controls the vehicle 10 to start a lane change to the adjacent lane. In the case that the type of line in the map differs from the detected type of lane line, the area on the destination side may actually have no lane and be an area other than a lane, such as the shoulder or margin of the road, or a lane change to the adjacent lane on the destination side may be prohibited. In this case, the control unit 33 controls the vehicle 10 so that the vehicle 10 continues traveling on the travel lane without starting changing lanes. The control unit 33 may further notify the driver of the fact that the lane change will not start and the reason thereof (mismatch between the types of lane lines), using a notification device provided in the interior of the vehicle 10, such as a display or a speaker.

FIG. 4 is a schematic diagram for explaining vehicle control according to the embodiment. The left in FIG. 4 represents an actual road structure 400 around the vehicle 10 whereas the right in FIG. 4 represents a high-precision map 401 representing a region corresponding to the structure 400. In this example, assume that a lane change to a lane 411 splitting leftward from a lane 410 being traveled is required of the vehicle 10, and that the position where the lane 411 splits from the lane 410 in the road structure 400 was changed from a location A to a location B after the delivery of the high-precision map 401 to the vehicle 10, i.e., the high-precision map 401 is not updated with the change in the position of splitting.

In a region 430 near the location A, the type of lane line 421 in the high-precision map 401 between the lanes 410 and 411 is a broken line. However, in a corresponding region 431 of the actual road structure 400, the type of the left lane line 422 of the lane 410 is a solid line because the lane 411 has not split yet near the location A. Hence, when the vehicle 10 is traveling near the location A, the type of the left lane line 422 of the lane 410 detected from an image generated by the camera 3 differs from that of the lane line 421 in the high-precision map 401 between the lanes 410 and 411 at the corresponding position. For this reason, the control unit 33 does not make the vehicle change lanes.

Near the location B, the type of the left lane line of the lane 410, i.e., the lane line 422 between the lanes 410 and 411 is a broken line because the lane 411 is split from the lane 410 also in the actual road structure 400. Hence, when the vehicle 10 is traveling near the location B, the type of the left lane line 422 of the lane 410 detected from an image generated by the camera 3 is the same as that of the lane line 421 in the high-precision map 401 between the lanes 410 and 411 at the corresponding position. For this reason, the control unit 33 controls the vehicle 10 to start changing lanes.

In this way, the control unit 33 controls the vehicle 10 to start changing lanes only if the detected type of lane line matches the type of the corresponding lane line in the map. Thus the control unit 33 can prevent a lane change to an adjacent lane at a position where such a lane change cannot be actually made.

At a lane change, the control unit 33 sets a planned trajectory of the vehicle 10 so that it will move from the travel lane to an adjacent lane. Specifically, the control unit 33 sets a planned trajectory so that the interval between the vehicle 10 and a vehicle traveling on the adjacent lane will be not less than a predetermined distance when the vehicle 10 reaches the adjacent lane. To achieve this, the control unit 33 detects a vehicle traveling on the adjacent lane, based on, for example, time-series images generated by the camera 3 or time-series ranging signals generated by a range sensor (not illustrated) provided for the vehicle 10. Specifically, the control unit 33 inputs the images or the ranging signals into a classifier as described in relation to the detection unit 31 to detect a vehicle, and determines whether this vehicle is traveling on the adjacent lane, based on the positional relationship between the left and right lane lines of the travel lane and the detected vehicle. The control unit 33 then applies a predetermined prediction filter to the trajectory of the detected vehicle in a preceding predetermined period obtained by tracking the vehicle, thereby predicting the trajectory of the detected vehicle from the current time until a predetermined time ahead. The control unit 33 refers to the predicted trajectory of the vehicle to set a planned trajectory so that the vehicle 10 will be at the predetermined distance or more from the vehicle on the adjacent lane.

Upon setting a planned trajectory, the control unit 33 executes automated driving control of the vehicle 10 so that it will travel along the planned trajectory. For example, the control unit 33 determines the steering angle for the vehicle 10 to travel along the planned trajectory by referring to the current position of the vehicle 10 and the planned trajectory, and outputs a control signal depending on the steering angle to an actuator (not illustrated) that controls the steering wheel of the vehicle 10. The control unit 33 also determines target acceleration of the vehicle 10 according to a target speed of the vehicle 10 and its current speed measured by a vehicle speed sensor (not illustrated), and sets the degree of accelerator opening or the amount of braking so that the acceleration of the vehicle 10 will be equal to the target acceleration. The control unit 33 then determines the amount of fuel injection according to the set degree of accelerator opening, and outputs a control signal depending on the amount of fuel injection to a fuel injector of an engine of the vehicle 10. Alternatively, the control unit 33 determines the electric power to be supplied to a motor of the vehicle 10 according to the set degree of accelerator opening, and outputs a control signal depending on the electric power to a driver of the motor. Additionally, the control unit 33 outputs a control signal depending on the set amount of braking to the brake of the vehicle 10.

FIG. 5 is an operation flowchart of the vehicle control process executed by the processor 23. The processor 23 may execute the vehicle control process in accordance with the following operation flowchart at predetermined intervals.

The detection unit 31 of the processor 23 detects the travel lane and the types of its left and right lane lines demarcating the travel lane, based on an image obtained by the ECU 5 from the camera 3 (step S101).

The lane change determining unit 32 of the processor 23 determines whether the vehicle 10 needs a lane change from the travel lane to the left or right adjacent lane (step S102).

When a lane change is unnecessary (No in step S102), the processor 23 terminates the vehicle control process. When a lane change is necessary (Yes in step S102), the control unit 33 of the processor 23 identifies the type of the left or right lane line of the travel lane detected on the destination side. The control unit 33 then determines whether the identified type of lane line matches the type of the corresponding lane line represented in the high-precision map (i.e., the type of line in the map) (step S103).

In the case that the detected type of lane line matches the type of line in the map (Yes in step S103), the control unit 33 determines that an accessible adjacent lane actually exists on the destination side. The control unit 33 then controls the vehicle 10 to start a lane change to the adjacent lane (step S104).

In the case that the detected type of lane line differs from the type of line in the map (No in step S103), the control unit 33 controls the vehicle 10 so that the vehicle 10 continues traveling on the travel lane without starting changing lanes (step S105). After step S104 or S105, the processor 23 terminates the vehicle control process.

As has been described above, the vehicle controller detects the type of lane line demarcating the travel lane from a sensor signal representing surroundings of the vehicle. When a lane change from the travel lane to the left or right adjacent lane is required, the vehicle controller further determines whether the detected type of lane line on the destination side of the travel lane matches the type of the corresponding lane line represented in the map information. In the case that the detected type of lane line matches the type of lane line represented in the map information, the vehicle controller determines that an accessible adjacent lane actually exists on the destination side, and controls the vehicle to start a lane change to the adjacent lane. In the case that the detected type of lane line differs from the type of lane line represented in the map information, the vehicle controller does not start changing lanes. In this way, the vehicle controller determines whether to start changing lanes by referring to not only map information but also the actual road structure around the vehicle represented by a sensor signal, which enables changing lanes at an appropriate position. As a result, the vehicle controller can prevent a lane change to an adjacent lane at a position where such a lane change cannot be actually made because the map information is not updated with the latest road structure around the current position of the vehicle.

According to a modified example, the detection unit 31 may determine the type of lane line between the travel lane and an adjacent area only when it is determined by the lane change determining unit 32 that a lane change is necessary, similarly to the control unit 33. This will reduce the total amount of computation of the vehicle control process because the processing by the detection unit 31 need not be executed when a lane change is unnecessary.

The detection unit 31 may detect the types of the left and right lane lines of the travel lane, based on a sensor signal that is generated by a sensor mounted on the vehicle 10 other than the camera 3 and that represents surroundings of the vehicle 10. In this case also, the detection unit 31 inputs the sensor signal into a classifier that has been trained to detect lane lines from the sensor signal and to determine the types of lane lines, thereby detecting the types of the left and right lane lines of the travel lane, as in the embodiment. As such a sensor, one whose sensor signal exhibits different characteristics depending on the types of lane lines, e.g., an FOT camera may be used.

According to another modified example, the control unit 33 may execute a process similar to that in the embodiment only if a target adjacent lane for a required lane change (hereafter, a "target lane") is a lane splitting from the travel lane within a predetermined distance of the current position of the vehicle 10. More specifically, the control unit 33 refers to the high-precision map and the current position of the vehicle 10 to determine whether the target lane is a lane splitting from the travel lane within a predetermined distance of the current position of the vehicle 10. Unless the target lane is such a lane, the control unit 33 does not determine whether the detected type of lane line between the travel lane and the target lane matches the type of lane line represented in the high-precision map. In other words, the control unit 33 controls the vehicle 10 to start changing lanes even if the detected type of lane line differs from the type of lane line represented in the high-precision map. In this way, the control unit 33 can prevent inexecution of a lane change when it is required for safety reasons, e.g., when the driver finds an obstacle on the travel lane and gives instructions to change lanes to avoid the obstacle.

A computer program for achieving the functions of the processor 23 of the ECU 5 according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller comprising:
    a memory configured to store map information representing individual lanes on a road and the types of lane lines between lanes; and
    a processor configured to:
        detect the type of lane line demarcating a travel lane being traveled by a vehicle from a sensor signal generated by a sensor mounted on the vehicle, the sensor signal representing surroundings of the vehicle, and
        determine whether the detected type of lane line at a current position of the vehicle matches the type of lane line represented in the map information between the travel lane and an adjacent lane adjacent thereto at the current position of the vehicle when a lane change to the adjacent lane is required, the processor controlling the vehicle so that the vehicle continues traveling on the travel lane when a lane change is required, in the case that the detected type of lane line differs from the type of lane line represented in the map information, and to start a lane change to the adjacent lane only in the case that the detected type of lane line matches the type of lane line represented in the map information.

2. A method for controlling a vehicle, comprising:
    detecting the type of lane line demarcating a travel lane being traveled by a vehicle from a sensor signal generated by a sensor mounted on the vehicle, the sensor signal representing surroundings of the vehicle;
    determining whether the detected type of lane line at a current position of the vehicle matches the type of lane line represented in map information between the travel lane and an adjacent lane adjacent thereto at the current position of the vehicle when a lane change to the adjacent lane is required, the map information representing individual lanes on a road and the types of lane lines between lanes; and controlling the vehicle so that the vehicle continues traveling on the travel lane when a lane change is required, in the case that the detected type of lane line differs from the type of lane line represented in the map information, and to start a lane change to the adjacent lane only in the case that the detected type of lane line matches the type of lane line represented in the map information.

3. A non-transitory recording medium that stores a computer program for controlling a vehicle, the computer program causing a processor to execute a process comprising:

detecting the type of lane line demarcating a travel lane being traveled by a vehicle from a sensor signal generated by a sensor mounted on the vehicle, the sensor signal representing surroundings of the vehicle;

determining whether the detected type of lane line at a current position of the vehicle matches the type of lane line represented in map information between the travel lane and an adjacent lane adjacent thereto at the current position of the vehicle when a lane change to the adjacent lane is required, the map information representing individual lanes on a road and the types of lane lines between lanes; and controlling the vehicle so that the vehicle continues traveling on the travel lane, in the case that the detected type of lane line differs from the type of lane line represented in the map information when a lane change is required, and to start a lane change to the adjacent lane only in the case that the detected type of lane line matches the type of lane line represented in the map information.

* * * * *